(No Model.)

F. B. JORDAN.
MEAT TENDERER.

No. 483,002. Patented Sept. 20, 1892.

WITNESSES:

INVENTOR: Frank B. Jordan,
PER ATTYS.

UNITED STATES PATENT OFFICE.

FRANK B. JORDAN, OF AUBURN, MAINE.

MEAT-TENDERER.

SPECIFICATION forming part of Letters Patent No. 483,002, dated September 20, 1892.

Application filed February 8, 1892. Serial No. 420,708. (No model.)

*To all whom it may concern:*

Be it known that I, FRANK B. JORDAN, of Auburn, in the county of Androscoggin, State of Maine, have invented certain new and useful Improvements in Meat-Tenderers, of which the following is a description sufficiently full, clear, and exact to enable any person skilled in the art or science to which said invention appertains to make and use the same, reference being had to the accompanying drawings, forming a part of this specification, in which—

Figure 1:
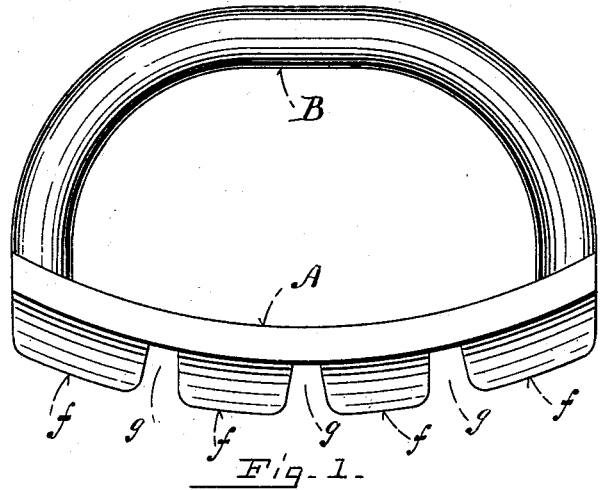
Figure 2:
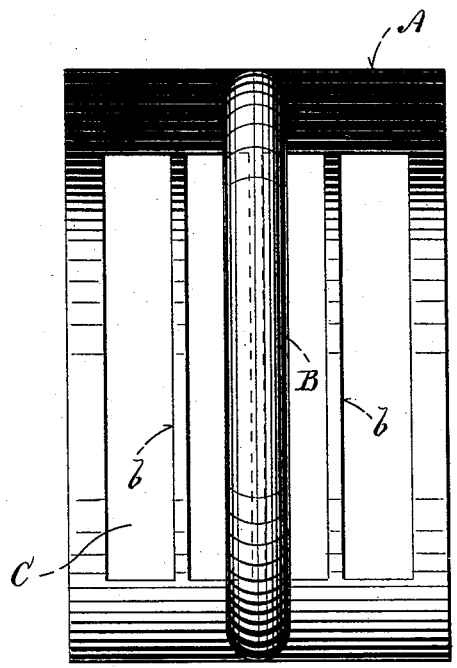
Figure 3:
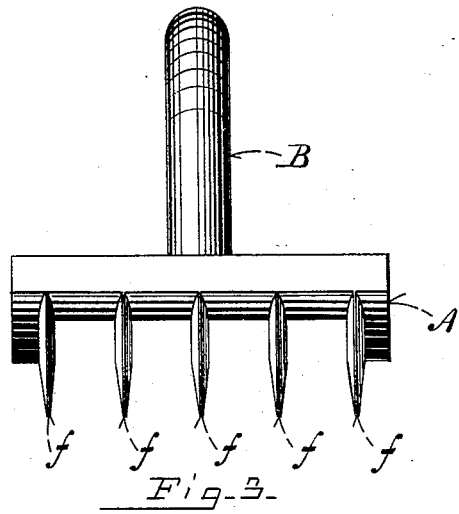

Figure 1 is a side elevation of my improved meat-tenderer; Fig. 2, a top plan view, and Fig. 3 an end elevation of the same.

Like letters of reference indicate corresponding parts in the different figures of the drawings.

My invention relates especially to a device for separating or cutting the fibers of steaks or similar meats before cooking, to permit the seasoning to enter, and to render the same more easily masticated.

In the drawings, A represents the body of the device, which is rectangular in top plan view, as shown in Fig. 2, and is curved or bent longitudinally into an arc, as shown in Fig. 1. A U-shaped handle B is secured concentrically to the top of the body and parallel longitudinal slots C are formed in said body.

On the convex face of the body and formed integral with the partitions *b* and the front and rear portion of the body A there is a number of short blades *f*, said blades being arranged longitudinally of the partitions. A row of short blades on each partition thus arranged leave spaces *g* at their ends, which extend upward to the partitions and body the full depth of the blade, thus having each blade separate from its companion blade. In the use of my improvement the blades are forced into the meat by pressure on the handle and the device is rocked longitudinally under said pressure. The short blades form openings in the meat, preventing the fiber thereof from being entirely severed, as the meat is not cut by the body at the top of the spaces, although in some cases the meat may be so thick that the entire blade penetrates therethrough, yet the blades being united only at the body and such body not having a cutting-edge under no circumstances can all the fibers of the meat be cut. The seasoning will readily penetrate while cooking the meat after it has been made tender.

By rocking the device the disadvantage incident to the use of tenderers of this class in which a hammering or pounding movement is necessary is entirely overcome. Such devices so bruise the meat as to frequently render it unpalatable or unfit for food. The slots C prevent the meat and juices from clogging the blades and render the device very easy to clean.

Having thus explained my invention, what I claim is—

1. A meat-tenderer comprising a vertically-curved body and a handle, partitions in said body forming slots, and a series of short longitudinal blades disposed integrally with the partitions and the rear and front portions of the body, said blades having spaces formed between their ends, said spaces extending from the cutting-edge of the knife to the body the full depth of the blade, so that each blade is separate from all other blades.

2. A meat-tenderer comprising a vertically-curved body and a handle, partitions in said body forming slots, and a series of short longitudinal blades having their cutting-edges disposed in arcs of a circle, each blade being disposed integrally with the partitions and the front and rear portions of the body, said blades having spaces formed between their ends, said spaces extending from the cutting-edge of the knife to the body the full depth of the blade, so that each blade is separate from all other blades.

FRANK B. JORDAN.

Witnesses:
SYLVESTER W. ELLIS,
GEORGE M. GOFF.